United States Patent [19] [11] Patent Number: 4,560,989
Radochonski et al. [45] Date of Patent: Dec. 24, 1985

[54] METHOD AND APPARATUS FOR ACCELERATING THE RECORDING RATE OF A CRT GRAPHIC RECORDER

[75] Inventors: Pierre Radochonski, Lake Oswego; John M. Kniffin, Tualatin; Joern B. Eriksen, Oregon City; Jerrold J. Rogers, Beaverton; William W. Gellatly, Portland, all of Oreg.

[73] Assignee: Tektronix, Inc., Beaverton, Oreg.

[21] Appl. No.: 602,889

[22] Filed: Apr. 23, 1984

[51] Int. Cl.[4] .......................... G01D 9/00; G01D 9/42
[52] U.S. Cl. ................. 346/1.1; 346/110 R; 358/300
[58] Field of Search ............... 346/1.1, 110 R, 161; 355/1; 354/4, 5; 358/300, 302

[56] References Cited

U.S. PATENT DOCUMENTS

| | | | |
|---|---|---|---|
| 3,581,102 | 5/1971 | Nagao | 346/110 R |
| 3,834,803 | 9/1974 | Tsukada | 355/1 |
| 3,836,917 | 9/1974 | Mee | 354/5 |
| 4,030,064 | 6/1977 | Elliott | 346/110 R |
| 4,096,487 | 6/1978 | Shafer | 346/110 R |

Primary Examiner—E. A. Goldberg
Assistant Examiner—Mark Reinhart
Attorney, Agent, or Firm—Francis I. Gray; Allston L. Jones

[57] ABSTRACT

Provided are an apparatus and a method for recording on a recording medium images from a fiber-optic CRT. The apparatus includes a recording medium transport system, control electronics and a first-in, first-out memory. The use of the first-in, first-out memory permits incremental recording which is not limited by relatively long mechanical transport settling times. In operation, N lines of data are input to the memory, line-by-line, as the transport system increments the position of the recording medium and during settling time. When the recording medium has come to rest, these N lines of data are output sequentially from the memory in a first-in, first-out basis, with the CRT incrementing each line vertically on the recording medium for the total of N lines for each increment of the recording medium by the transport system.

11 Claims, 3 Drawing Figures

METHOD AND APPARATUS FOR ACCELERATING THE RECORDING RATE OF A CRT GRAPHIC RECORDER

BACKGROUND OF THE INVENTION

This invention relates to graphic recording apparatus, and more particularly to cathode ray line scan recorders.

In this type of device the recording medium (e.g. light sensitive film or paper) is moved by a mechanical drive system along a path substantially normal to the display unit (e.g., a cathode ray tube). The image is recorded on the medium as it is exposed by a scanning beam from the display unit as a gray scale recorded image.

A typical recorder employs a stepper motor which moves the medium one line scan width after a previous line has been written. That technique provides a relatively slow recording rate since the delay required after each motor step to allow for medium settling time before the next line of information can be written is a factor of at least four to ten times slower than the cumulative delays of the CRT deflection system and the photographic recording speed of the medium. The recording speed of the medium in turn is dependent on two additional factors, the light sensitivity of the medium and the CRT beam intensity.

Therefore, in a situation where it is necessary to record real-time data at a rate that is faster than the medium settling rate of a stepped medium type recorder, the current systems cannot be used. The present invention overcomes that problem and allows the use of the same CRT recorder at a higher speed.

SUMMARY OF THE INVENTION

In accordance with the preferred embodiment, the CRT recorder of the present invention includes means for controlling a drive motor to move the recording medium in incremental steps, such that the recording medium is advanced to the next position after N lines of information are recorded on the medium rather than in the conventional manner of one line at a time. This is to minimize the number of mechanical transfers of the recording medium and thus reduce total waiting time for settling during the complete recording cycle.

Each time the medium is advanced, the beam of the cathode ray tube is deflected vertically in order to record the N lines on the recording medium. Thus, at least N lines of data must be available to the CRT during that recording interval. This is accomplished by collecting data and storing it in a dual port, first-in, first-out (FIFO), buffer memory, from which it can be retrieved at appropriate times in order to be recorded. With the dual port feature it is possible to read data into the memory not only during paper transport and settling, but also at the same time that information is being written from the memory to the CRT. Therefore, by providing enough memory to accumulate all incoming data during medium transport and settling, the recorder can receive input data continuously, since the line write rate is typically much faster than the input line (read) rate.

DESCRIPTION OF THE PREFERRED EMBODIMENT

Figure 1:
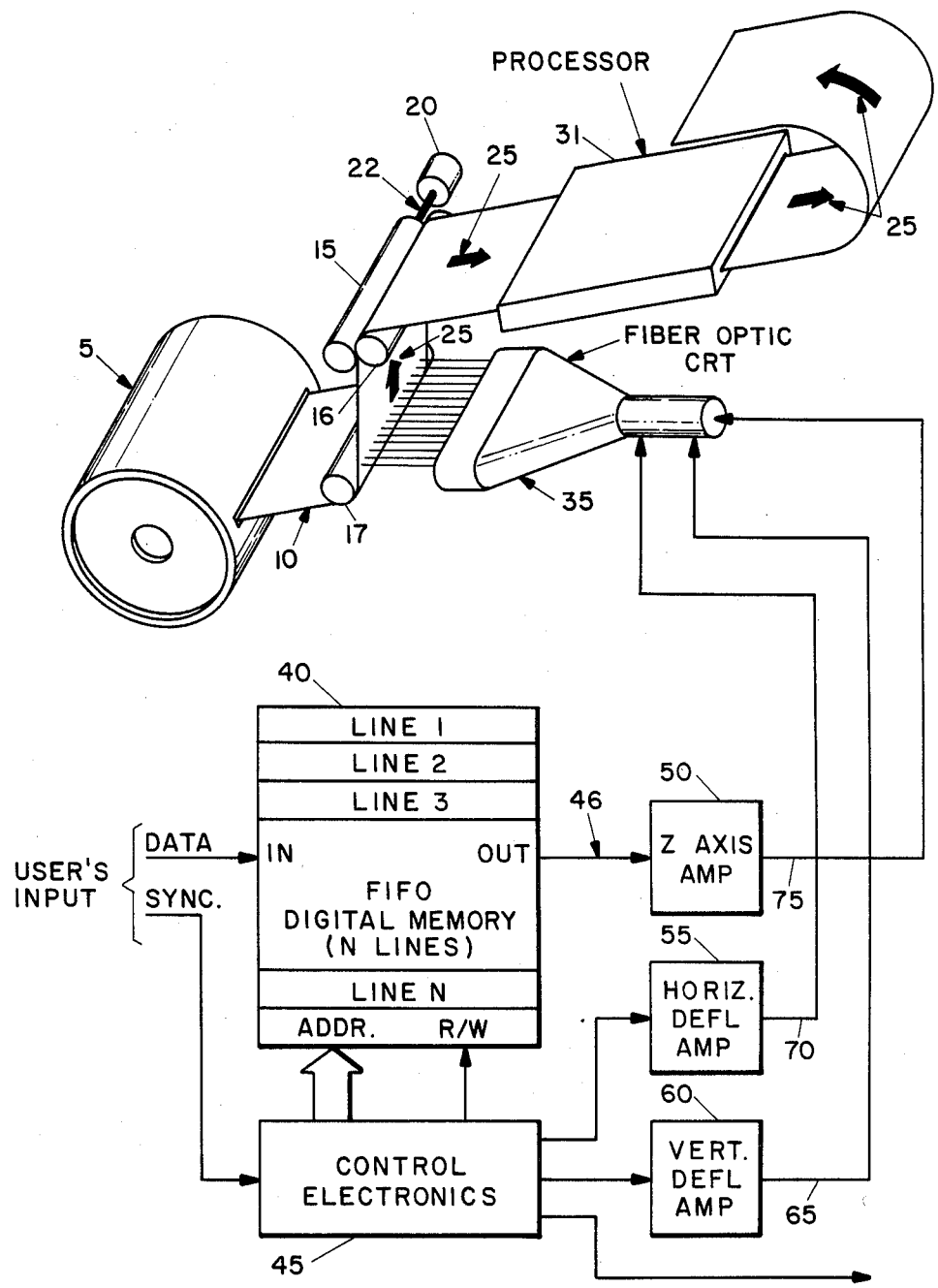
FIG. 1 shows, schematically, a line scan recorder according to the present invention.

In accordance with the preferred embodiment of the invention, FIG. 1 depicts a cathode ray line scan recording apparatus. The recorder includes a fiber optic cathode ray tube (CRT) 35 for exposing a continuous web of recording medium, shown as light sensitive paper 10, with the image to be recorded line-by-line.

In normal operation, the paper 10 is transported from a medium supply canister 5 by means of a motor 20, a stepper motor in this embodiment, which drives a roller 15. Driven roller 15 together with idler 16 form a pinch roller assembly for pulling paper 10 from canister 5, around an idler 17 and past the face of CRT 35 along a path indicated by the directional arrows 25. A mechanical linkage 22 is provided to selectively communicate rotational motion to driven roller 15 from drive motor 20. Additionally, the paper 10 is transported through a developing processor 31 and beyond by a take-up means, which is not shown in FIG. 1.

Figure 2:
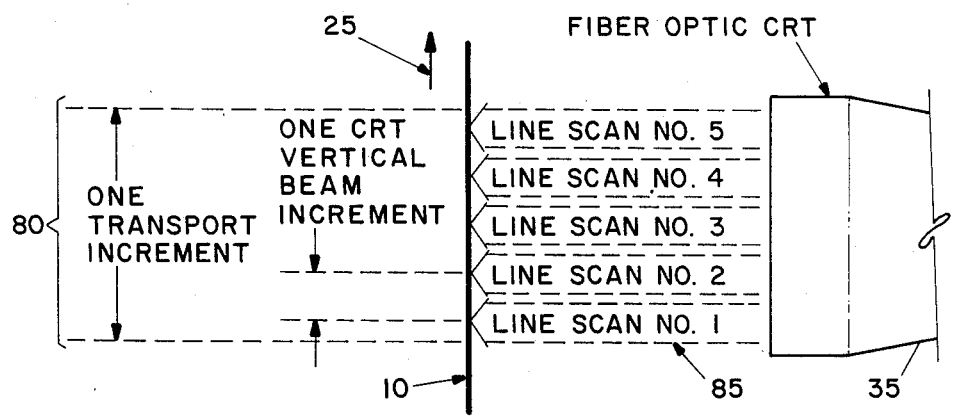
FIG. 2 is a side view of the recording medium and the cathode ray tube showing the method of vertically recording the series of lines on a segment of the medium at each incremental step of the motor.

The motor 20 causes the transportation of the paper 10 in incremental steps, i.e., it advances the paper a prescribed incremental distance 80 (see FIG. 2). The system then waits a prescribed period of time sufficient to permit the paper 10 and its drive mechanism to settle. Then the portion of the paper adjacent the CRT face is exposed, and the paper is advanced again. The incremental distance 80 in FIG. 2 is determined by the number of lines that are to be recorded on paper 10 each time the paper is advanced. Generally, the maximum number of lines which can be recorded each time paper 10 is advanced is physically limited by the maximum angle that the scanning beam of the CRT 35 can be deflected, and still provide a positive rendition of data to be recorded with adequate intensity and without distortion. In this particular embodiment, it is assumed for purposes of illustration that the maximum useable deflection angle of the CRT corresponds to five (5) lines, and that the time required for receiving 5 lines of input data is adequate to permit settling of the transport system and paper. Hence, the incremental step 80 along direction 25 has been chosen to be equal to 5 lines, in order that the output on paper 10 appear continuous.

To expose the paper with N lines of data (in this instance 5 lines) within a recording interval, at least N lines of data must be available to the CRT during that recording interval. This is generally accomplished by collecting data and storing it in a dual port, FIFO, buffer memory 40, from which it can be retrieved at appropriate times in order to be recorded on paper 10. With the dual port feature it is possible to read data into the memory not only during paper transport and settling, but also at the same time that information is being written from the memory to the CRT. Therefore, by providing enough memory to accumulate all incoming data during paper transport and settling, the recorder can receive input data continuously, since the line write rate is typically much higher than the input line (read) rate.

Figure 3:
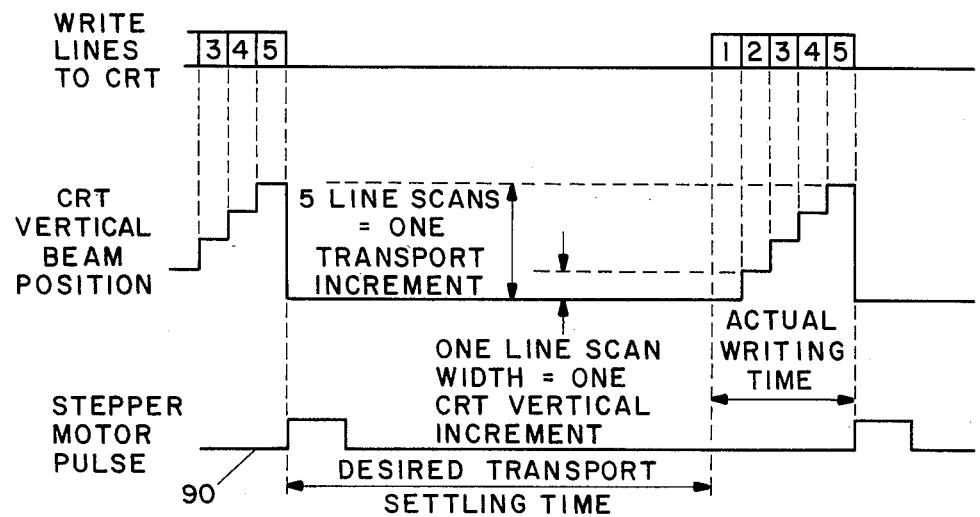
FIG. 3 is a timing diagram which depicts the timing of the data collection, beam scanning/data recording on the medium, and the advancing of the recording medium.

FIG. 3 illustrates the timing principles involved in this method of continuous recording. At the end of a previous write sequence, or initially, a signal 90 is sent to motor 20, causing motor 20 to transport paper 10 an incremental step along its direction of travel 25. As indicated earlier, data images are typically received continuously during operation. These images are converted by an analog to digital converter (not shown) to a digital form, and the corresponding digital information is stored serially in memory 40, line by line, on a first-in, first-out (FIFO) basis. Once paper 10 has settled into its resting position after signal 90, output from memory 40 and the horizontal sweep from horizontal deflection amplifier 55 are triggered by control electronics circuitry 45. As the first line of the collection of lines leaves memory 40, it is converted to analog form by a digital to analog converter in Z-axis amplifier 50 and applied to the electron gun of CRT 35 to modulate the intensity during the horizontal sweep. As light from the trace on the CRT illuminates paper 10, the data image is recorded thereon by virtue of its light sensitivity.

After recording the first line, the vertical position of the CRT 35 line scan beam is incremented by one line scan width by means of a vertical deflection control system 60, and a pulse is applied to memory 40 to trigger the transfer of the next line in the collection of lines to be transferred for recording in this interval. The next line of data is then transferred from the memory, converted into analog form and applied to the gun for recording. This process is repeated several times until the designated number of lines in the collection has been recorded (i.e., 5 lines in this example). Once the designated number of lines has been recorded, another pulse is transmitted to motor 20 to cause the transportation of paper 10 through another incremental step 80 corresponding to the total width of the designated number of line scans (see FIG. 2) and the process begins again. This iterative scheme then continues until all of the incoming data is recorded or the recording process is terminated.

While there has been shown and described the preferred embodiment of the present invention, it will be apparent to those skilled in the art that many changes and modifications may be made without departing from the invention in its broader aspects. Therefore, the appended claims are intended to cover all such modifications and changes that fall within the true spirit and scope of the invention.

What is claimed is:

1. A method of recording a collection of data images in a given linear interval on a recording medium when said recording medium is transported to a fixed position before a display medium, said display medium to be synchronized with the transport of the recording medium to said fixed position, the method comprising the steps of:
   a. transporting said recording medium a distance at least equal in length to said linear interval;
   b. sequentially storing a plurality of lines of input data to be recorded on said recording medium in said linear interval;
   c. retrieving the input data from storage, one line at a time; and
   d. displaying said plurality of lines as retrieved, one line at a time, on said display medium by incrementing each line in one direction on said display medium to permit the displaying of said plurality of lines over said linear interval.

2. A method as in claim 1 wherein step (d) includes:
   e. triggering the display of the first line of said plurality of lines at a time after the recording medium has come to rest after step (a).

3. A method as in claim 2 wherein step (b) further includes:
   f. converting the input data to digital form; and
   g. storing the converted data of step (f) in a FIFO buffer memory.

4. A method as in claim 3 wherein step (c) includes:
   h. converting the data stored in said FIFO memory from digital to analog form.

5. A method as in claim 1 wherein step (d) further includes:
   i. irradiating a CRT faceplate with a scanning electron beam; and
   j. deflecting said scanning electron beam in said one direction one line width on said CRT faceplate for each line being scanned.

6. A method as in claim 5 wherein said linear interval is equal in length to the sum of the heights of the plurality of lines scanned by said electron beam.

7. A line scan recording device for recording a collection of data images in a given linear interval on a recording medium, comprising:
   transport means for selectively transporting said recording medium through said given linear interval in response to a transport signal;
   FIFO memory means for receiving a plurality of lines of input data corresponding to said data images and for storing said plurality of lines of input data sequentially, line-by-line and for providing output signals corresponding to said input data, sequentially, line-by-line, on a first-in, first-out basis in response to a display control signal;
   display means located proximately to said recording medium and coupled to said FIFO memory means for receiving said output signals, and for displaying in response to said display control signal said plurality of lines of input data in the sequence received, one line at a time, and for incrementing each line in one direction on said display means such that said plurality of lines is displayed over a distance corresponding to said given linear interval;
   control means coupled to said transport means, to said display means, and to aid FIFO memory means for providing said transport signal and for providing said display control signal after said recording medium has come to rest after transporting said recording medium.

8. A device as in claim 7 wherein said transport means comprises a stepper motor.

9. A device as in claim 7 wherein said display means comprises a fiber-optic cathode ray tube.

10. A device as in claim 9 wherein said display means further comprises Z-axis amplifier means for receiving said output signals from said FIFO memory means and for converting said output signals from digital to analog signals to modulate the intensity of said cathode ray tube display.

11. A device as in claim 7 wherein said control means provides an alternating sequence of said transport signals and said display control signals, for causing the recording on said recording medium of data images on a plurality of said linear intervals.

* * * * *